June 23, 1925.
A. T. KVARNSTROM
CABLE CONNECTER
Filed May 12, 1923
1,543,213
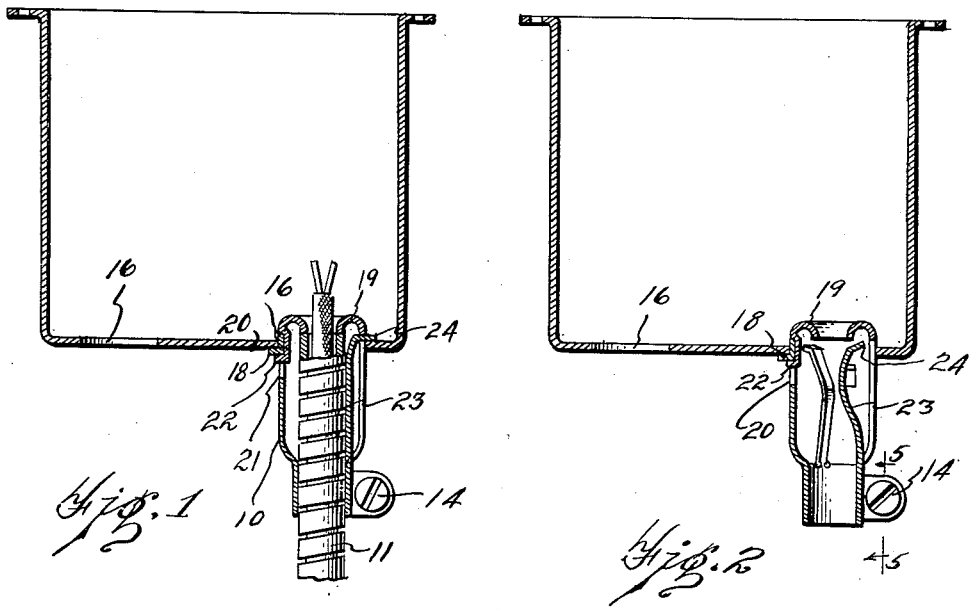
Fig. 1
Fig. 2
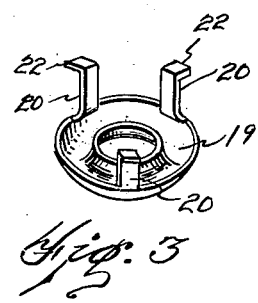
Fig. 3
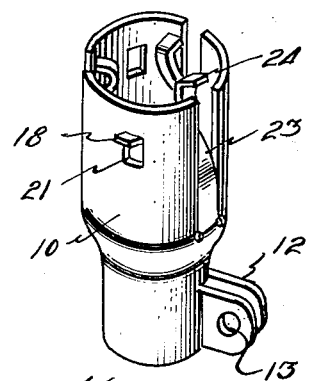
Fig. 4
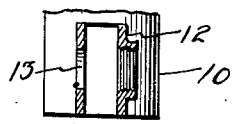
Fig. 5
INVENTOR.
BY ALFRED T. KVARNSTROM
Rahzmond A. Parker
ATTORNEY.

Patented June 23, 1925.

1,543,213

UNITED STATES PATENT OFFICE.

ALFRED T. KVARNSTROM, OF DETROIT, MICHIGAN, ASSIGNOR TO SAMUEL SOLOMON, OF DETROIT, MICHIGAN.

CABLE CONNECTER.

Application filed May 12, 1923. Serial No. 638,463.

*To all whom it may concern:*

Be it known that I, ALFRED T. KVARN-STROM, a citizen of the United States, residing at Detroit, county of Wayne, State of Michigan, have invented a certain new and and useful Improvement in Cable Connecters, and declare the following to be a full, clear, and exact description of the same, such as will enable others skilled in the art to which it pertains to make and use the same, reference being had to the accompanying drawings, which form a part of this specification.

My invention relates to cable connecters to be used for removably securing an electric cable to an outlet box or other similar article.

The object of my invention is to provide a simple, inexpensive cable connecter of the class described which is capable of removable attachment to the end of an electric cable, with novel improved means for detachably engaging the connecter to an outlet box or other similar article to which it is desired to secure the cable, and a meritorious important feature of my invention is the provision of means operable to be held in engagement with the outlet box to secure the connecter thereto by the cable which carries the connecter.

Another object is to provide a cable connecter having a tubular body member capable of receiving the end of the cable and being securely fastened about the cable, which body member is provided with movable parts adapted to be thrust outwardly to engage the wall of an outlet box or other device upon the insertion of the cable in the body member, such parts adapted to be held outwardly by the cable and operable to be disengaged from such outlet box to permit detachment of the connecter upon withdrawal of the cable relative the connecter.

As appears in the specific illustrative embodiment of my invention here shown and described, an important object is to form such a connecter of sheet metal with a body member to receive the end of the cable and be securely fastened thereabout and having wall portions adapted to be constricted radially to permit insertion of the end of the connecter into an aperture in the wall of an outlet box, which wall portions are operable to be thrust outwardly to engage such outlet box wall and be held in such outwardly thrust position by the cable to which the connecter is attached.

In the drawings,—

Figure 1 is a sectional view through an outlet box to which a cable is attached by means of my connecter.

Fig. 2 is a similar sectional view showing the end of my improved connecter inserted in the aperture in the outlet box with the cable removed.

Fig. 3 is a perspective of the annular end closure for the connecter body.

Fig. 4 is a perspective of the connecter body with the end closure member removed.

Fig. 5 is a section taken on the line 5—5, Fig. 2.

In the particular embodiment of my invention herein shown for illustrative purposes, the connecter comprises a sheet metal body member 10 which is preferably of reduced diameter at one end to fit snugly about an armored cable 11. The wall of the body member at such end is bent outwardly to form ears 12 which are provided with threaded apertures 13 to receive a clamping screw 14. The tubular body is compressible and through the instrumentality of the screw 14 it is possible to clamp the body of the connecter tightly about the cable to releasably secure the connecter thereto.

The opposite end of the body member is of increased diameter and is receivable within an aperture such as 16 formed in the wall of an outlet box or other similar article 17.

Shoulders 18 are punched up out of the wall of the body member to form stops which limit the insertion of the end of the body member through the aperture 16 in the wall of the outlet box so that the end of the body member projects slightly beyond the inside wall of said box.

The end of the body member which extends into the outlet box is preferably partially closed by an annular member 19, which annular member is provided with extensions 20 that are turned into the apertures 21 as at 22 formed by punching outwardly the shoulders 18 to secure the annular member to the body member as shown.

The body member is slitted longitudinally adjacent the closed end thereof to provide wall portions 23, the ends of which wall portions adjacent the closed end of the body member are turned outwardly as at 24. These wall portions are preferably normally compressed so that their outwardly turned ends do not extend beyond the wall of the body member but the wall portions are adapted to be thrust outwardly so that the turned-over ends do extend beyond the wall of the body member and held in such outwardly thrust position by the cable disposed within the body member when the cable is inserted in the body member to such an extent as to force these wall portions outwardly. After the end of the body member has been inserted into the aperture in the outlet box, it will be seen that the turned-over ends of these wall portions will engage the inner surface of the wall of the outlet box when thrust outwardly, thereby clamping the connecter thereto. The wall of the box adjacent the aperture through which the connecter extends is clamped between the shoulders 18 of the body member and the turned-over ends of the expansible wall portions. It will be noted that these outwardly bent ends of the expansible wall portions are bent outwardly at a slight angle so as to grip closely the wall of the outlet box.

It will also appear that the extension of the connecter body interiorly of the outlet box is very slight, thereby taking up a minimum of space within the box.

In order to release the connecter from the outlet box, all that is necessary is to first remove the cable, upon the removal of which the wall portions 22 may be depressed inwardly so that their outwardly bent ends clear the margin of the aperture in the outlet box and permit the removal of the connecter.

What I claim is:

1. The combination with a wall having an aperture to receive therethrough a cable, a tubular sheet metal connecter received within the aperture to secure the cable to the wall, said connecter received over the end of the cable and received within the aperture in the said wall and having tongue portions punched from the body thereof held outwardly by the cable extending through the connecter to engage said wall, said connecter body having shoulders punched therefrom engaging said wall on the opposite side, and an annular member, receivable within the end of said connecter to partially close such end which annular member has outwardly turned portions engaged in the openings in the body of the connecter formed by the punching therefrom of the said shoulders.

2. The combination with a wall member apertured to receive a cable and a cable to be received through said aperture, said cable provided with a conductor extending therethrough and beyond the end thereof, of a tubular sheet metal connecter received over the end of the cable so that the cable extends therethrough, said connecter having one end snugly secured to the cable and the opposite end enlarged thereover, said connecter having openings through the wall thereof and an annular end closure for the enlarged end of the connecter apertured to be received over that portion of the conductor that projects beyond the end of the cable, said end closure having resilient fingers extending into the connecter and engaging in the openings through the wall thereof to secure the end closure thereto.

In testimony whereof, I sign this specification.

ALFRED T. KVARNSTROM.